(No Model.) 3 Sheets—Sheet 2.
A. WEMPLE.
BAND CUTTER AND FEEDER FOR THRASHING MACHINES.
No. 518,729. Patented Apr. 24, 1894.
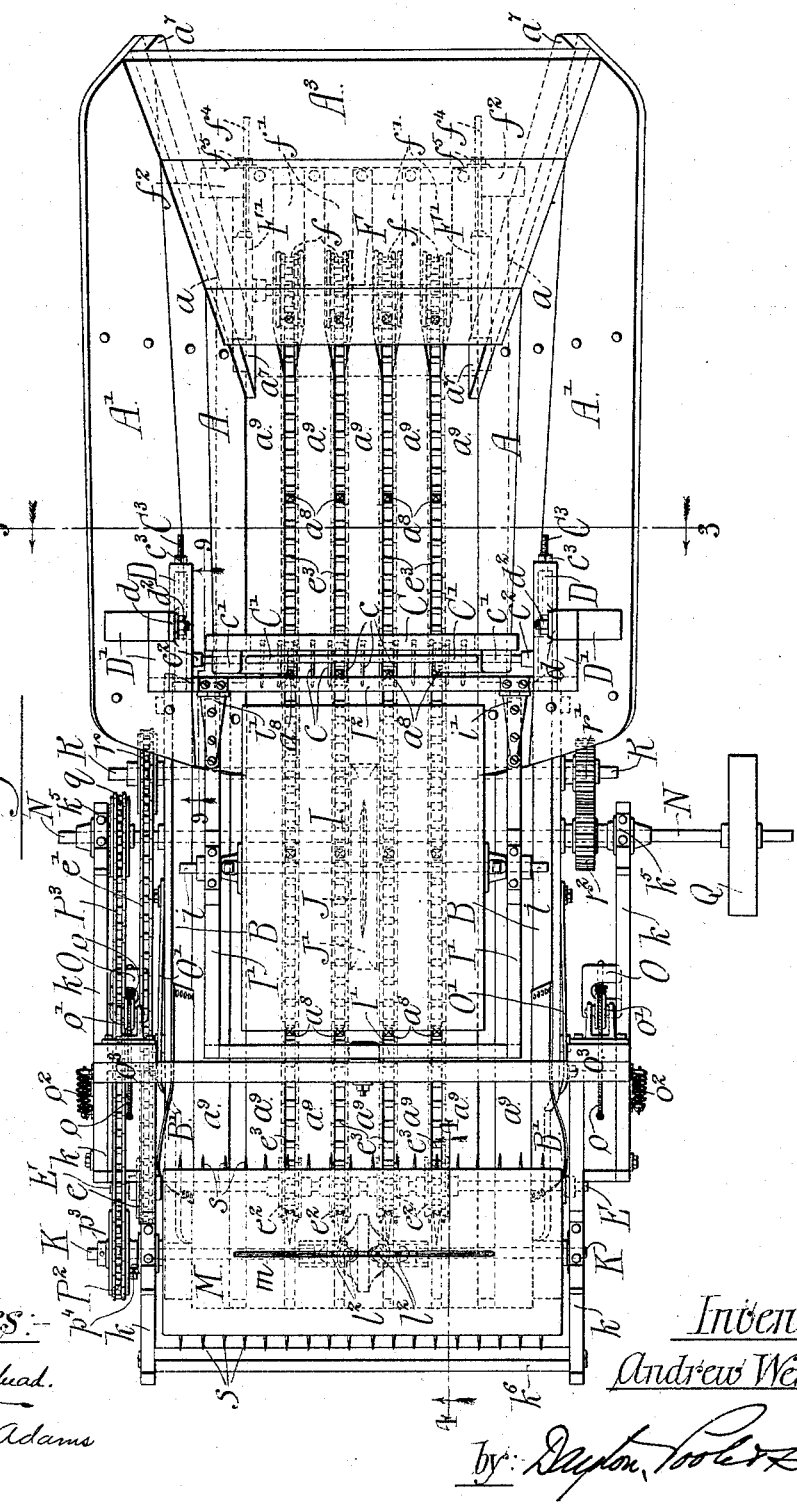
Witnesses:-
Louis M. F. Whitehead.
John W. Adams
Inventor:-
Andrew Wemple.
by Dayton, Poole & Brown
his Attorneys.

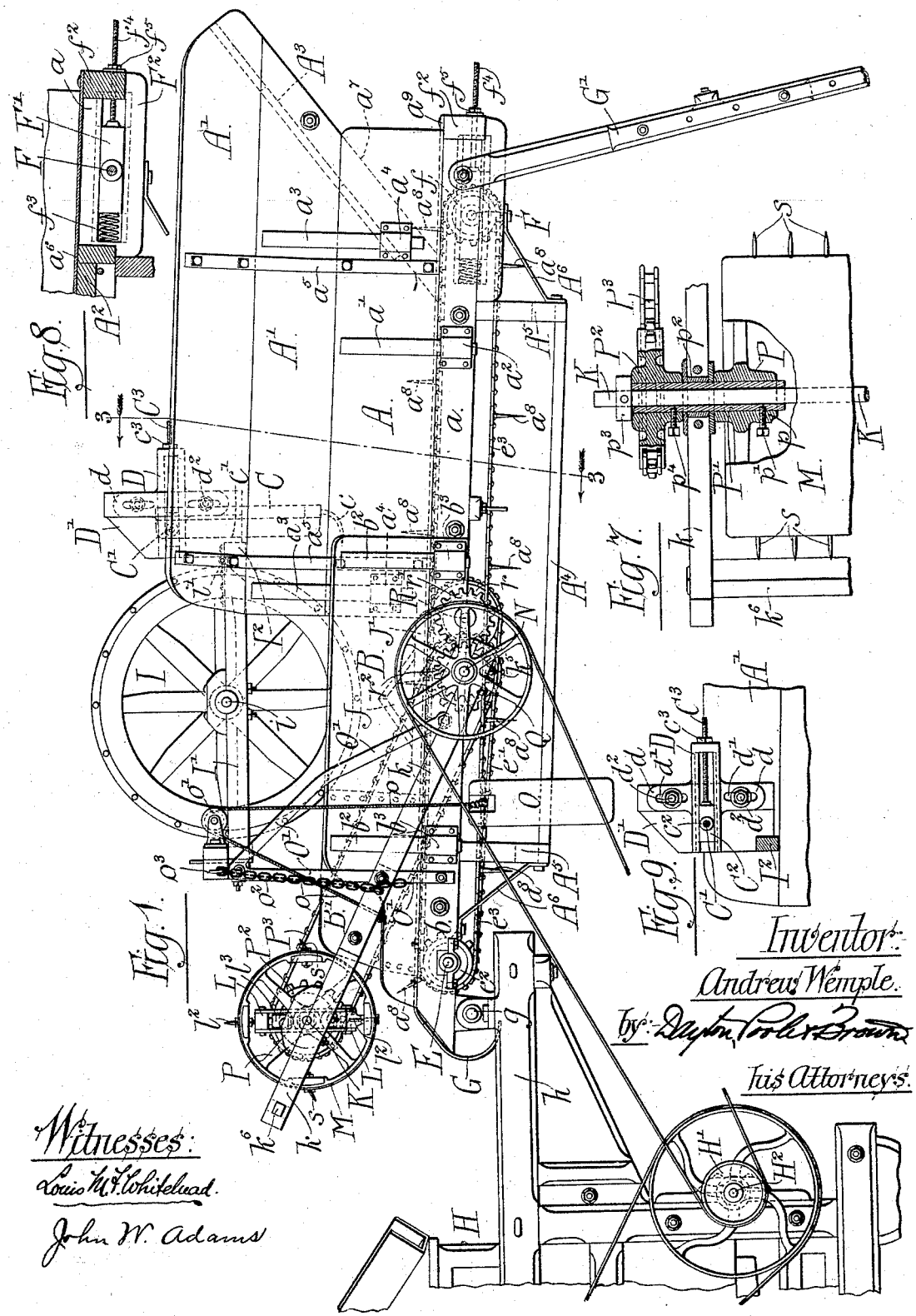

(No Model.) 3 Sheets—Sheet 3.
A. WEMPLE.
BAND CUTTER AND FEEDER FOR THRASHING MACHINES.
No. 518,729. Patented Apr. 24, 1894.
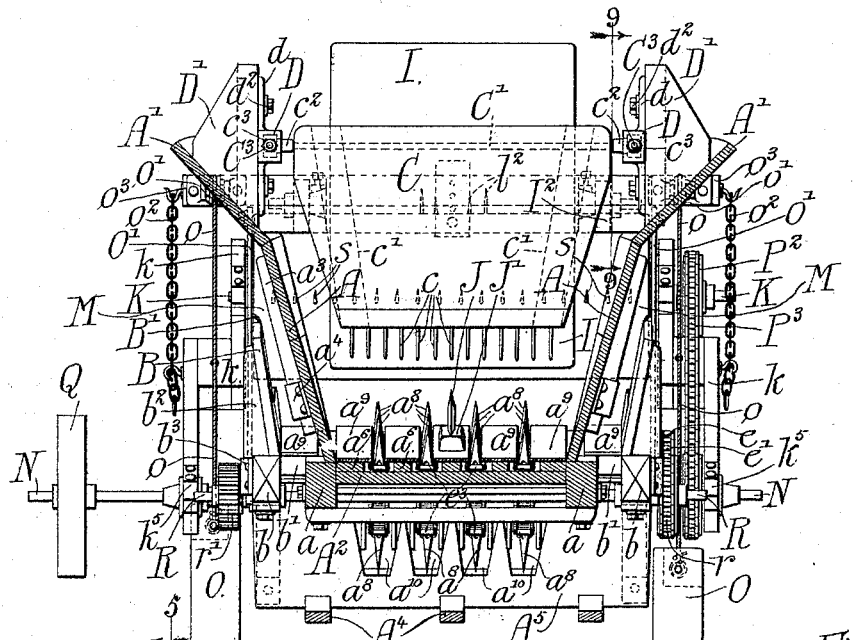
Witnesses:
Louis M. F. Whitehead.
John W. Adams.
Inventor:
Andrew Wemple.
by Dayton, Poole, & Brown
his Attorneys.

UNITED STATES PATENT OFFICE.

ANDREW WEMPLE, OF CHICAGO, ILLINOIS, ASSIGNOR OF ONE-HALF TO JOHN S. PIHLSTROM, OF SAME PLACE.

BAND-CUTTER AND FEEDER FOR THRASHING-MACHINES.

SPECIFICATION forming part of Letters Patent No. 518,729, dated April 24, 1894.

Application filed November 17, 1892. Serial No. 452,236. (No model.)

*To all whom it may concern:*

Be it known that I, ANDREW WEMPLE, of Chicago, in the county of Cook and State of Illinois, have invented certain new and useful Improvements in Band-Cutters and Feeders for Thrashing-Machines; and I do hereby declare that the following is a full, clear, and exact description thereof, reference being had to the accompanying drawings, and to the letters of reference marked thereon, which form a part of this specification.

My invention relates to machines for severing the bands (either of twine or straw) with which sheaves of wheat, oats, and other grains are bound, and for feeding the unbound grain to the cylinders of thrashing-machines.

Among the various objects of my invention, the primary one is to produce a band-cutting and feeding mechanism which shall operate in such manner as to thoroughly open the bundles or sheaves of grain, after the bands thereof have been cut or severed, and which shall evenly and uniformly deliver or feed the grain to the cylinder of a thrashing-machine, so as to avoid all possibility of choking or overfeeding, and so, consequently, as to insure a most rapid and thorough thrashing of the grain without injury to the latter.

A further important object of my invention is to so construct the framework of band-cutters and feeders that while it is adapted to receive several bundles simultaneously but one sheaf or bundle of grain shall be operated upon at a time, and yet ample space be provided within the framework for the opening and spreading of the grain.

A still further object of my invention is to produce a band-cutting and feeding mechanism which, in addition to the advantages above enumerated, shall be simple, strong, compact and durable in its construction, direct, rapid and effective in its operation, and which shall be capable of application to a great variety of types of thrashing-machines.

In order that my invention may be fully understood, I will proceed to describe it with reference to the accompanying drawings, in which—

Figure 1 is a view in side elevation of a band-cutting and feeding mechanism embodying my invention; the mechanism being shown as operatively connected to a thrashing-machine. Fig. 2 is a plan view of the band-cutting and feeding mechanism disconnected from a thrashing-machine. Fig. 3 is a transverse vertical section of the same, taken on the lines 3—3 of Figs. 1 and 2. Fig. 4 is an enlarged transverse vertical sectional view of the spreading and delivering mechanism, taken on the lines 4—4 of Figs. 2 and 5. Fig. 5 is an enlarged longitudinal sectional view of the spreading and delivering mechanism, taken on the lines 5—5 of Fig. 4. Fig. 6 is a view similar to that of Fig. 5, but showing a modified construction of the spreading and delivering mechanism. Fig. 7 is an enlarged view, partly in plan and partly in horizontal section, of the actuating connections for the spreading and delivering mechanism. Fig. 8 is an enlarged vertical longitudinal section of one of the tension-connections for the sheaf-carriers. Fig. 9 is an enlarged view, partly in inner side elevation and partly in vertical longitudinal section on the line 9—9 of Fig. 2, of one of the pivotal and adjustable connections of the gate or guard.

In the said drawings, A designates the rear or receiving end of the machine-frame, and B the front or delivery end of the same; the rear portion A being termed by me the "hopper" and the front portion B being properly called the main frame or housing. It is to be observed that the rear portion or hopper is shown in Fig. 2 of the drawings, and that the lower part of the hopper is only wide enough for a single bundle so that while a number of bundles of grain can be thrown into the hopper simultaneously, only one sheaf or bundle can pass, at a time, from the hopper into the front portion or main housing B of the machine, and that the bundle or sheaf can be fully spread open within the said front housing. The side walls or boards of the hopper A are shown as extending longitudinally parallel with each other and also as diverging upward slightly from each other; these side walls being supported upon side-beams or stringers *a* which form the sides of the bottom of said hopper. The side walls of the hopper are also shown as connected with the side-beams or stringers by means of any number of stakes $a'$ shown as secured to the outer sides of said side-walls and as entering sockets or "pockets" $a^2$ which are secured to the outer sides of the stringers $a$; the side walls being thus removable from the bottom of the hopper. As will be seen from the ensuing description, not only the side walls of the hopper, but also the upper extensions of said side walls, and also the side walls of the main housing, and the end wall of the hopper, are all shown as removable, and although it will be obvious that such parts may be permanently secured in their several positions, yet when so removable, shipment or transportation of the machine is greatly facilitated.

The upper extensions $A'$ of the side-walls of the hopper A diverge upwardly and outwardly at a greater angle than that of the side walls and are connected with said side walls by stakes $a^3$ which enter sockets or pockets $a^4$ secured to the outer sides of the said side-walls. In order to further secure the upper extensions $A'$ to the side walls of the hopper, vertical bars $a^5$, of metal or wood, may be used as shown, and may be bolted to the outer sides of the side walls and extensions. The extensions A are shown as of equal length with the side walls of the hopper, and both as of about half the length of the framework of the entire machine; this precise proportional length being that which is found well suited to the operative purposes of the machine, but being obviously susceptible of variation, as circumstances may suggest.

$A^2$ designates the bottom of the framework, this being a closed bottom of less width at at its rear portion and of greater width at its front portion. The narrower portion of the bottom $A^2$, or that portion which extends within the side walls of the hopper, is suitably secured to the side-beams or stringers $a$, and carries, upon its upper surface, a number of parallel longitudinal strips $a^6$, for a purpose to be hereinafter explained.

$A^3$ designates the end-board or wall of the hopper, said board or wall being of upwardly flaring shape, at its side margins, so as to conform to the transverse contour of the hopper and also to completely close the rear end of said hopper. As above stated, this end board or wall $A^3$ is preferably mounted removably within the hopper, and to this end the end-wall rests against two cleats $a^7$ which are bolted or otherwise suitably secured to the inner sides of the extensions $A'$ and of the side walls of the hopper, at the rear ends thereof; the said cleats being preferably inclined upwardly and rearwardly so as to impart a similar inclination to the end-wall.

In supplying the bound sheaves of wheat, or other grain, to the machine, the intention is that a person shall be stationed beside the framework of the machine and throw the sheaves into the hopper over the side of same, the hopper being preferably capable of containing a number (say six or more) of the sheaves at the same time; the sheaves being piled longitudinally within the hopper, preferably with the butts of the stalks adjacent to the rear end of the machine. It is necessary, however, that but one sheave at a time shall be carried into the front or wider part of the machine, and in order to insure this result, I preferably provide a gate or guard C which is interposed pivotally and in pendent position between the side walls of the hopper, near the front ends thereof. This gate or guard C is shown as formed of a board or other similar closed body-portion or frame which conforms approximately to the transverse contour of the hopper, but which may be of less width and is necessarily of less height than said hopper. At its lower edge, this gate or guard C may, if desired, be provided with a number of downwardly extending and forwardly curved fingers $c$ which serve to assist the action of the gate or guard, as hereinafter explained. This guard or gate C is supported pivotally in pendent position from a cross-shaft $C'$ which occupies a horizontal position at the upper part of the hopper and the end-portions of which extend through the upper parts of two cleats $c'$ which are secured to the gate C. The extremities of this shaft enter and rest loosely in sockets $c^2$ which are carried by two movable bearing-plates $C^2$; one of said bearing-plates being located at each side of the hopper. It will thus be seen that the gate or guard C depends pivotally within the hopper, and that, in certain instances, the gate can consequently be readily swung upwardly and rearwardly so as to permit access from within the hopper to the operative devices within the front portion or main housing of the machine. This gate or guard is also so arranged as to be adjusted horizontally toward and away from the rear end of the hopper, for the purpose of insuring the proper piling of the sheaves within the hopper, and said gate is furthermore so arranged as to be adjusted vertically within the hopper, so as to accord approximately with varying diameters of sheaves; it being understood that a sufficient space is afforded between the bottom $A^2$ of the hopper and the lower edge, or the fingers $c$, of the guard C, to permit but one sheaf, at a time, to pass beneath the guard. The devices for effecting these horizontal and vertical adjustments of the guard C are constructed and arranged as follows: Each pivot-bearing plate $C^2$ is mounted to slide horizontally within a horizontal guide frame or casting D which is secured adjustably upon the inner side of a bracket-piece $D'$; said bracket-piece being bolted or otherwise secured to the inner side of one of the extensions $A'$, at the front end thereof; there being two of the said bracket-pieces and guide-frames, one of each at each side of the hopper. Each guide-frame D is formed with two ears $d$, one projecting above and the other projecting below the guide-frame, each of which ears is formed with a vertically elongated opening or slot $d'$. Two bolts $d^2$ are inserted into the bracket-piece $D'$, so as to protrude inwardly from the same and also inwardly through the slots $d'$; said bolts carrying upon their inner ends nuts which bind upon the inner sides of the ears $d$ and thus retain the guide-frames in connection with the brackets $D'$. From the rear end of each bearing-plate $C^2$ extends horizontally rearward a screw-stem $C^3$ which also extends freely through the rear end of the corresponding guide-frame D. An adjusting-nut $c^3$ is screwed upon each screw-stem $C^3$ and impinges against the rear end of the guide-frame D, and it will be seen that by turning the two nuts $c^3$ in one direction (as to the right) the bearing-plates $C^2$ will be moved rearwardly, while, by turning said nuts in the opposite direction, the bearing-plates can be moved forwardly. It will also be seen that, by loosening the nuts upon the bolts $d^2$, the guide-frames D can be raised or lowered vertically, and that the subsequent tightening of the nuts upon said bolts $d^2$ will retain the guide-plates D in their desired position of vertical adjustment. Inasmuch as the gate or guard must move always with the bearing-plates $C^2$, it is obvious that the horizontal and vertical adjustments above described effect corresponding horizontal and vertical adjustments of the gate or guard, for the purposes previously stated.

Upon the front end of the machine-frame is mounted horizontally a shaft E which extends transversely of the machine-frame and which is journaled in stationary bearings near the front ends of the side beams or stringers $b$ of the main housing B. This shaft protrudes at one end beyond the side of the main housing and carries thereon a sprocket-wheel $e$ over which leads a sprocket-chain $e'$; this sprocket-chain leading from a sprocket-wheel upon the main power-shaft of the machine, as will be hereinafter fully explained. At points between the side-beams or stringers $b$, the shaft E carries a number of sprocket-wheels $e^2$ which are arranged to turn with the shaft and over which lead sprocket-chains $e^3$. As shown, the shaft E carries four sprocket wheels $e^2$ and there are also four sprocket-chains $e^3$, but it is to be understood that the precise number of wheels $e^2$ and chains $e^3$ may be varied, as circumstances may suggest; there being permissibly more or less than four wheels. In any event, however, there should be more than one wheel and chain, and the area of the hopper and main-housing bottom should be well embraced by said belts. These belts extend parallel with each other rearwardly of the machine-frame and lead each over one of a corresponding number of sprocket-wheels which are so mounted upon a second shaft F as to turn with said shaft. This shaft F is mounted horizontally at the rear end of the machine-frame, so as to extend transversely thereof, and the rear end of the hopper-bottom $A^2$ is formed with a number of longitudinal recesses $f'$ within which are placed the sprocket-wheels $f$; the rear end of the hopper-bottom being strengthened by a cross bar or cleat $f^2$, as shown in dotted lines in Fig. 2. The two end-portions of the shaft F are journaled in two longitudinally movable bearing-blocks $F'$ each of which slides within a guide-frame $F^2$ secured in the rear end-portion of the hopper-bottom $A^2$. Between the front end of each bearing-block $F'$ and the front end-portion of the corresponding guide-frame $F^2$ is interposed a spiral contraction-spring $f^3$, the function of which is to draw the bearing-blocks $F'$ forward. From the rear end of each bearing-block $F'$ extends rearwardly a screw-stem $f^4$ which protrudes loosely through the cross-bar or cleat $f^2$ of the hopper-bottom $A^2$. Upon these screw-stems are screwed suitable nuts $f^5$ which abut or impinge against the rear side of the cross-bar or cleat $f^2$, and it will be seen that by turning the nuts $f^5$ in one direction (as, to the left) the springs $f^3$ will be permitted to draw the bearing-blocks $F'$ forward, while by turning the nuts $f^5$ in the opposite direction the bearing-blocks $F'$ will be drawn rearward. Obviously the shaft F must move with its bearing-blocks, and consequently the described adjustments of the bearing-blocks serve to preserve the proper working tension of the sprocket-chains $e^3$. Each sprocket-chain $e^3$ runs longitudinally over the upper side of the hopper-bottom $A^2$ and between the ribs $a^6$ thereof, and is provided at regular intervals with outwardly extending spurs $a^8$. The upper sides of the ribs $a^6$ are preferably shod with metal wear-plates $a^9$, and the lowest sheaf or bound bundle rests directly upon the said wear-plates $a^9$. The shaft E so revolves that the spurs $a^8$, engaging the lowest sheaf, move it forward upon the hopper-bottom, and from beneath the upper sheaf, and carry said lowest sheaf beneath the gate or guard C and thence to the band-cutter, to be hereinafter described. It will be seen that those spurs $a^8$ which are below the hopper-bottom project downwardly, and to protect said spurs from injury by contact with the ground, when the machine is not in use, longitudinal bars or beams $A^4$ are placed at some distance below the bottom of the machine-frame and are secured at their ends to cross-pieces $A^5$; these cross-pieces being shown as having openings $a^{10}$ for the passage of the sprocket-chains $e^3$, and being also braced forwardly and rearwardly by oblique braces $A^6$.

The side-beams or stringers $b$ of the main housing B are located outwardly beyond the side-beams or stringers $a$ of the hopper A; filling-pieces $b'$ (see Fig. 3) being employed to maintain the bottom of the main housing in properly closed condition. The sides of the main housing B rest upon the side-beams or stringers $b$ and extend obliquely upward and outward therefrom; suitable stakes $b^2$, which are shown as secured to the outer sides of the side-walls of the main housing, entering sockets $b^3$ secured to the outer sides of the stringers $b$, and the side-walls of the main-housing being thus removably secured in position, as previously stated. The front end-portions of these side-pieces are preferably reduced in height, as shown, and extend forwardly to the front ends of the stringers $b$; sheet metal shield-plates B' being preferably secured to the front ends of the sides so as to properly inclose the front of the main housing. A downwardly curved guard-plate G is also preferably secured across the front end of the main-housing bottom, for the purpose of preventing the spurs $a^8$ from carrying any of the grain backward beneath the machine-frame on the return movements of the sprocket-chains $e^3$.

The rear end of the machine-frame is shown as supported upon two struts or legs G' which, at their upper ends are pivotally or otherwise suitably connected to the rear end of the machine-frame and which are properly braced together and stiffened.

The front end of the machine frame is shown as resting upon the receiving end of the thrashing machine H, of any preferred type, and in this instance is pivotally connected therewith by means of bolts $g$ which engage co-acting lugs on the stringers $b$ and on the adjacent end of the thrashing machine.

I desire it to be understood that while I have shown the main-frame of the cutting and feeding machine as thus supported upon the feed-board of a thrashing-machine and as also supported upon the struts G' I do not wish to be understood as confining myself exclusively to such means of support. In fact a suitable wheeled running gear may be used for supporting the machine-frame, or various other types of supports may be used, without departing from the spirit of my invention.

I designate an idle-drum which is located immediately above the bottom of the main housing B and the shaft $i$ of which is journaled in a rectangular frame I' which is hinged, as at $i'$, to a horizontal cross-bar I², the ends of which are secured to the front ends of the extensions A' of the hopper. This drum is thus free to roll upon the incoming sheaf and, by its weight, to press the band of the sheaf into effective contact with the band-cutter J. This band-cutter is in form of a triangular blade or sickle which is rigidly inserted into a suitable block J'; said block being bolted or otherwise secured in stationary position upon the bottom of the main housing B at a point directly beneath the idler I. It will thus be seen that as the sprocket-chains $e^3$ and their spurs $a^8$ move the sheaf forward, the idler presses the sheaf downward upon the blade J and that said blade quickly cuts or severs the band, whether said band be of cord or straw. After the band of the sheaf has thus been cut or severed the sheaf is carried forward to the spreading and delivering devices which I will now proceed to describe.

K designates a horizontal and non-revoluble shaft which extends transversely of the machine-frame, at the front ends thereof; the end-portions of which are so secured to the upper sides of two supporting-bars $k$ as to avoid all rotation of the shaft. Upon this shaft at a point midway of its length, is secured a stationary cam-plate or block K', the said block being shown as secured rigidly to the shaft K by set bolts or a through cross-pin $k'$; it being understood that various means may be obviously employed for retaining the cam-plate or cam-block K' in stationary position upon the stationary shaft K. At a point perpendicularly below the center of the stationary or non-revoluble shaft K, the cam-block K' is formed at each side with two oppositely disposed and horizontally divergent cam-surfaces $k^2$; there being thus four of these cam-surfaces $k^2$, arranged two at each side of the cam-plate or block, and each cam-surface being shown as of segmental form so as to extend upwardly from its point of juncture with its companion cam-surface.

Referring now more particularly to the construction shown in Figs. 4 and 5, L designates two revoluble arms one of which is located at one side of the cam-plate or block K and each of which is pivotally secured midway, of its length, to a sleeve $l$ which loosely surrounds the stationary shaft K so as to revolve upon said shaft; each of the two sleeves $l$ being retained in position by a collar $l'$ which is secured rigidly to the shaft and which abuts against the outer end of one of the sleeves $l$. As shown in these two figures of the drawings, each arm L is of skeleton-form and is of segmental shape. At each extremity, each of the arms L carries a number of fingers $l^2$ which extend longitudinally from the arms, and at its inner side, about midway from its pivot, each arm carries two rollers $l^3$ which work in contact with the side and cam-surfaces of the cam-block or plate K'. The shaft K is surrounded by a hollow drum or cylinder M which is arranged (as will be presently explained) to revolve around the shaft K, and which is provided at opposite points, peripherally, with two elongated openings or slots $m$, which extend longitudinally of the drum. The fingers $l^2$ protrude outwardly through the slots $m$ and the arms L are rotated upon the shaft K by contact with the sides of the slots. The connections for rotating the drum or cylinder M will presently be fully described, but it will be understood that the drum is so rotated that its upper part moves rearwardly and its lower part forwardly. As the drum thus revolves, the end-portions of the arms L alternately move upwardly and rearwardly and downwardly and forwardly in a circular path. As the lower portions of the arms move downwardly and forwardly their rollers $l^3$ ride upon the cam-surfaces $l^2$ and consequently the lower parts of the arms are moved outwardly or laterally away from each other, while the upper ends of said arms are moved laterally inward toward each other. As the upper ends of the arms, in turn, move downwardly, their rollers $l^3$ likewise ride upon the cam-surfaces $l^2$ and they are similarly moved outwardly from each other. Thus it will be clearly seen that the downward and forward movements of the arms L (which are the effective movements thereof) are accompanied by simultaneous lateral movements away from each other. As the arms move downward and forward, their fingers $l^2$ enter the bundle or sheaf and in conjunction with the sprocket-chains $e^3$, feed the grain forward through the front end of the machine-frame. At the same time, the described lateral movements of the arms spread or open the bundle, and as the drum is speeded to a sufficient extent to travel considerably faster than the sprocket-chains $e^3$, these downward and lateral movements of the fingers $l^2$ act repeatedly upon the same mass of grain. The spurs $a^8$ of the chains $e^3$ engage and hold the lower portion of the bundle while its upper portion is spread laterally by the fingers $l^2$, whereby the straw is evenly distributed across the entire width of the housing. The length or height of the cam-surfaces $k^2$ and the length of the arms L, and also the diameter of the drum or cylinder M, are proportionately such that when the arms L' have completed their outward movements, the fingers $l^2$ shall be wholly withdrawn into the slots $m$ of the drum M. Thus the fingers are sure to clear themselves from the grain, and no tangling or carrying over of the grain can occur, and a most effective feeding and spreading of the grain is insured.

In Fig. 6, I have shown a construction of the feeding and spreading devices which embodies the same essential principles of action as those of the mechanism just described, but which involves certain minor modifications of construction. In this instance, two pairs of separate arms L' are employed, instead of but two arms L the end-portions of each of which protrude oppositely through the slots $m$. The inner end of each pair of arms L' is pivoted, as at $l^4$, upon one of the sleeves $l$. One arm of each pair extends diametrically or radially opposite from the opposite arm of said pair, so that two sets of fingers $l^2$ extend through each slot $m$ as before. One arm of each pair is connected to the adjacent arm of the other pair by a spiral contraction-spring $l^5$, but in other respects this arrangement is precisely similar to that previously described. As the two pairs of arms L' revolve, their rollers $l^3$ successively ride upon the cam-surfaces $k^2$, separating the arms laterally, as before, to effect the spreading or opening of action, and drawing upon the springs $l^5$. As soon as the pair of arms L' have passed the cam-surfaces $k^2$, the springs $l^5$ draw the two arms together in readiness for a successive separation.

The two arms $k$ upon which the non-revoluble shaft K is mounted, are pivoted at their front ends upon the lower-shaft N of the machine, as shown at $k^5$, and the front or outer ends of said arms are connected together by a cross-bar $k^6$ which preserves the required rigidity of the arms. The arms $k$ are counterbalanced by two counterweights O which are located at opposite sides of the machine-frame, at the front-end of the same, and each of which is connected to one end of a rope $o$, or a chain, or other flexible connection; said ropes or flexible connections being led over sheaves $o'$ and their opposite ends being connected to the outer parts of the arms $k$. The sheaves $o'$ are shown as mounted upon a cross-bar $o^3$ which connect two vertical supports O' which rise from the front ends of the sides of the main housing B, and the entire arrangement is such that the counterweights O neutralize a considerable part of the weight of the connected parts and prevent the spreading attachments from bearing too heavily upon the loosened grain. Chains $o^2$ are hooked or otherwise suitably connected at their lower end with the arms $k$ and are similarly connected at their upper ends with the opposite ends of a cross-bar $o^3$ which connects the two supports O'; these two chains preventing any excessive depression of the spreading-mechanism.

The peripheral casing of the drum M is connected at its ends with two heads P, P, which turn freely upon the shaft K, and into the hub $p$ of one of these heads is tightly secured (either by a set-bolt $p'$, or otherwise) a sleeve P'. This sleeve surrounds and turns freely upon the corresponding end of the shaft K and protrudes outwardly beyond this extremity of said shaft; said sleeve also passing freely through a bearing-connection $p^2$ for the corresponding arm $k$. Upon the outer end of the sleeve P' is mounted a sprocket-wheel P² which turns with the sleeve, and which is retained in position by a collar $p^3$ upon the extremity of the shaft K; a set-bolt D⁴ being shown as the means for securing the turning of the sprocket-wheel P² with the sleeve P', but it being obvious that various other means may be employed for this purpose. Over the sprocket-wheel P² leads a sprocket-chain P³ which imparts rotation to the sprocket-wheel, thence to the sleeve P', and through the head P to the drum M; the said drum thus being revolved while the shaft K is non-revoluble.

In order to effect a constant feed or discharge of the spread grain, the drum M is provided with fixed feeding fingers or spurs $s$ which are bolted or otherwise suitably fixed upon the periphery of the drum so as to project outwardly therefrom. As shown, these fixed feeding-fingers are arranged in two rows each of which extends longitudinally of the drum, and each of which is diametrically opposite the other. It is to be also observed that the protruding ends of the spreader-arms L are interposed between the rows of fixed fingers s so as to act alternately with the fixed fingers. The arrangement is such that after the spreader-arms have acted to open or spread the grain, the fixed feeding-fingers act in conjunction with the spurs $a^8$ on the chains $e^3$, to move the grain when so spread, forward out of the front end of the machine. The fixed feeding-fingers s s are preferably inclined backwardly or rearwardly, referring to the direction of motion of the drum, so as to avoid liability of the straw being caught by the fingers and wrapped about the drum.

I will now describe the general actuating gearing of the machine. Power is received by a belt which is led over a pulley Q upon one end of the power-shaft N; this belt being shown as running over and being driven by a pulley H' on a shaft $H^2$ of the thrashing-machine. Obviously, however, power may be obtained from any source either connected with or wholly separated from the thrashing-machine. At its opposite end from that which carries the pulley Q, the power-shaft N carries a sprocket-wheel q over which runs the sprocket-chain $P^3$ from the sprocket-wheel $P^2$ of the spreader-drum M. A second sprocket-chain e', which runs over the sprocket-wheel e of the shaft E which drives the sprocket-chains $e^3$, also runs over a sprocket-wheel r upon one end of the countershaft R. This shaft R extends transversely of the machine-frame, back of and parallel with the power-shaft N. That end of the countershaft R which is opposite the end carrying the sprocket-wheel r, carries a gear-wheel r' the teeth of which mesh with the teeth of a similar gear-wheel $r^2$ upon a corresponding part of said power-shaft N. Thus the power-shaft N being rotated in the proper direction, the gear-wheels $r^2$, and r', and the shaft R will cause the sprocket chain e' to so rotate the shaft E as to propel the upper strands of the sprocket-chains $e^3$ forwardly, while the sprocket-chain $P^3$ will cause the drum M to so rotate the spreader-arms as to cause their lower ends or parts to move forwardly in their downward positions; the several and various functions above described being all produced by the movements of these operative connections from a single power-shaft.

One of the principal and most valuable features of my invention is embraced in the laterally movable spreading arms acting to engage and tear apart or spread the bundles, whereby the bundle is opened as it is fed forward to the thrashing-machine and an even and uniform feeding of the grain to the said machine is secured, with the result of a more perfect and uniform action of the thrashing-machine and the avoidance of liability of clogging the same, and as far as this main feature of the invention is concerned, other means than the particular ones shown, may be employed to move or actuate said spreading arms in a manner to produce the result described. Other features of the invention are, however, also novel and produce valuable results in practice and the same are also herein claimed as part of my invention.

I claim as my invention—

1. A feeding mechanism for thrashing machines comprising a pair of revoluble spreading arms having a movement alternately toward and from each other in the direction of their axis of revolution whereby the straw is spread laterally, substantially as described.

2. A feeding mechanism for thrashing machines comprising a shaft, spreading arms pivotally journaled on said shaft, and means for revolving and oscillating said arms, substantially as described.

3. A feeding mechanism for thrashing machines comprising a shaft, spreading arms pivotally journaled on said shaft, means for revolving the arms, and cams on the shaft for oscillating the arms, substantially as described.

4. A feeding mechanism for thrashing machines comprising an endless carrier provided with projecting spurs, and having a pair of revoluble spreading arms mounted above said carrier and having a lateral movement alternately toward and from each other whereby the straw is evenly distributed laterally as it is fed forward, substantially as described.

5. A feeding mechanism comprising a revoluble feeding drum provided with one or more longitudinal rows of feeding fingers and revoluble spreading arms turning with the said feeding drum and arranged intermediate with the rows of feeding fingers thereon, substantially as described.

6. A feeding mechanism comprising a revoluble feeding drum provided with one or more rows of feeding fingers and with one or more longitudinal slots intermediate with the said feeding fingers, and laterally movable spreading arms mounted concentrically with the drum and extending through said slot or slots, substantially as described.

7. A feeding mechanism comprising a receptacle for the bundles, means located in the bottom of the receptacle for feeding forward the bundles, a feeding drum located above the bottom of the receptacle and provided with one or more rows of feeding fingers, and revoluble spreading arms turning with the drum and located between the rows of feeding fingers, said feeding fingers and spreading arms being driven at a speed greater than that of the feeding mechanism in the bottom of the receptacle, substantially as described.

8. A feeding mechanism comprising a receptacle for the bundles, a carrier belt located in the bottom of the same, a feeding drum located over the carrier belt and provided with feeding fingers at one or more points in its circumference, revoluble spreading arms mounted concentrically with the drum and arranged intermediate with the feeding fingers thereon, said drum and the spreading arms being driven at a speed greater than that of the carrier belt, substantially as described.

9. A band cutting and feeding mechanism comprising a receptacle for the bundles, a carrier belt or belts located in the bottom of the same, a stationary band cutter, a revoluble feeding drum located over the carrier belt or belts and provided with feeding fingers at one or more points in its circumference, revoluble laterally movable spreader arms mounted concentrically with the drum and arranged at points intermediate to the feeding fingers thereon, and means for actuating the carrier belt or belts, the feeding drum and spreading fingers, giving a more rapid movement to the said feeding drum and spreading arms than to the carrier belts, substantially as described.

10. A feeding mechanism, comprising a number of revoluble laterally movable spreading arms, a non-revoluble shaft on which the same are mounted and a stationary cam-plate or block carried by said shaft and serving to move said arms laterally away from each other, substantially as described.

11. A feeding mechanism, comprising a non-revoluble shaft, a stationary cam thereon, a number of revoluble spreading arms revoluble upon the shaft and engaging said cam so as to be moved laterally outward thereby, and a revoluble actuating-casing surrounding the shaft and slotted to receive the ends of the arms, substantially as described.

12. A feeding mechanism, comprising a non-revoluble supporting shaft, a stationary cam mounted thereon and a number of revoluble spreading arms revoluble upon said shaft and engaging the cam, and contraction springs connecting said arms in pairs for maintaining engagement of the arms with the cam, substantially as described.

13. A bundle feeding mechanism, comprising means for feeding forward the bundles and a spreading mechanism consisting of a plurality of revoluble and laterally movable arms, of which the opposite pairs are connected rigidly with each other, and a stationary cam for effecting the lateral movement of the arms, substantially as described.

14. A feeding mechanism, comprising means for feeding forward the bundles, a revolving drum and spreading arms mounted in the drum and having a combined lateral inward and outward movement whereby in the operation of said spreading arms the latter may be retracted within the outer surface of the drum at the termination of their outward lateral movement, substantially as described.

15. A feeding mechanism, comprising means for feeding forward the bundle, a revoluble drum, revoluble and laterally movable spreading arms mounted in the drum, said arms being pivotally supported with in the drum whereby they are adapted to recede toward the center of the drum as they are moved outwardly, and means for giving oscillatory movement to the said arms, substantially as described.

16. A band cutting and feeding mechanism comprising a receiving hopper adapted to contain a plurality of bundles, means for feeding forward each successive lowermost bundle, and a horizontally and vertically adjustable pivoted gate at the exit end of the hopper for restraining all bundles above the lowermost bundle, substantially as described.

17. A feeding mechanism comprising a receiving hopper adapted to contain a plurality of bundles and made wide enough in its lower part to contain one bundle only, an endless carrier for feeding forward the lowermost bundle, and a gate at the exit end of the hopper for restraining all bundles above the lowermost bundle, substantially as described.

In testimony that I claim the foregoing as my invention I affix my signature in presence of two witnesses.

ANDREW WEMPLE.

Witnesses:
C. CLARENCE POOLE,
G. W. HIGGINS, Jr.